Jan. 8, 1935.   C. T. GODWIN   1,986,966
APPARATUS FOR VIEWING PICTURES AND THE LIKE
Filed Dec. 9, 1931
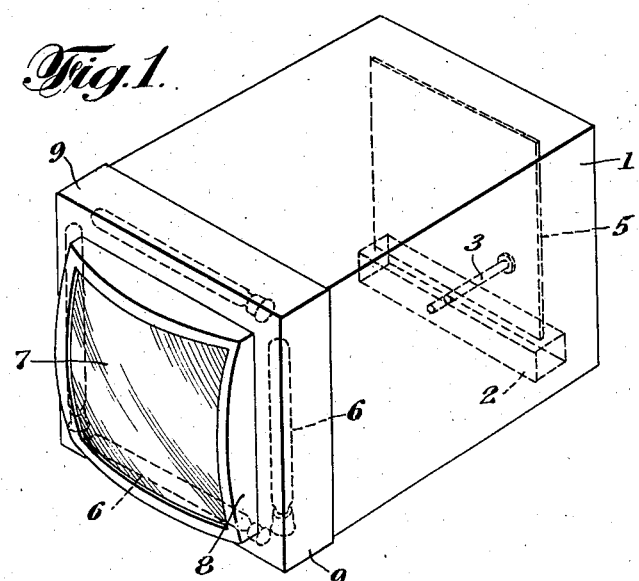
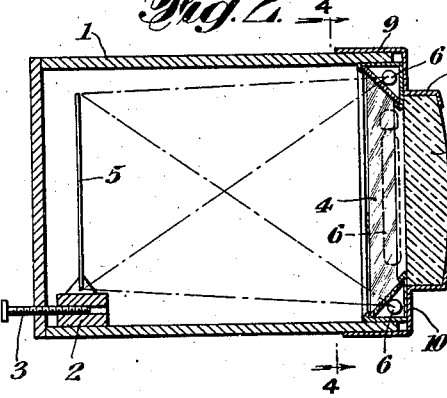 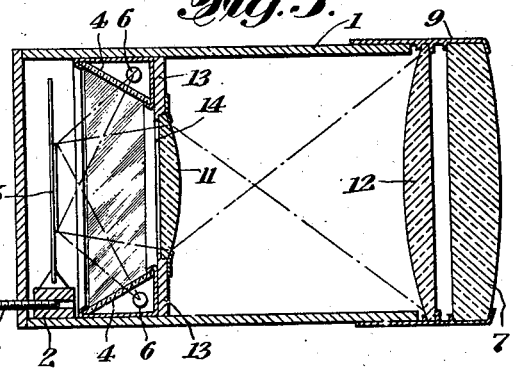
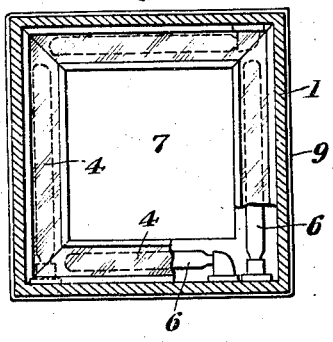 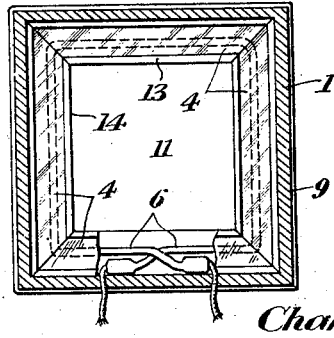
INVENTOR
Charles T. Godwin
BY
ATTORNEYS Patented Jan. 8, 1935

1,986,966

UNITED STATES PATENT OFFICE 1,986,966

APPARATUS FOR VIEWING PICTURES AND THE LIKE

Charles T. Godwin, Yonkers, N. Y., assignor to New Screen Corporation, New York, N. Y., a corporation of New York Application December 9, 1931, Serial No. 579,840

3 Claims. (Cl. 88—29)

This invention relates to apparatus for viewing pictures, photographs, lithographs and the like and has for its object the provision of means for creating an illusion of relief to such pictures.

Another object of the present invention is to provide stereoscopic viewing means for pictures, photographs, lithographs and the like.

Still another object is to provide suitable apparatus for viewing such pictures including means to support the picture, means to illuminate the same and means to stereoscopically view the pictures.

Other objects and advantages will be apparent as the invention is more fully disclosed.

In accordance with the objects of the present invention I have devised apparatus for viewing pictures, photographs, lithographs and the like by reflected light, which apparatus includes a housing means to support the picture therein, means to indirectly illuminate the picture and a stereoscopic lens viewing system therefor, all as will be more fully hereinafter disclosed, by reason of which apparatus pictures, photographs, lithographs and the like may be viewed with a striking and marked illusion of relief.

Before further disclosing the nature and scope of the present invention reference should be made to the accompanying drawing wherein:

Fig. 1 is a perspective view of the picture viewing apparatus of the present invention;

Fig. 2 is a sectional side elevation view of the same;

Fig. 3 is a sectional side elevation view of a modified structure;

Figure 4 is a sectional view taken along plane 4—4 of Fig. 3; and

Fig. 5 is a similar sectional view showing a modification in the illuminating means employed.

Referring to the drawing the picture viewing apparatus of the present invention comprises a light tight casing 1 including a picture supporting means 2 and means 3 to adjust the same; means to illuminate the picture 5 including a light source 6 and light diffusing means identified by numeral 4; and stereoscopic viewing means 7 including a convex type lens 7 supported in frame 8 adapted as by means 9 to be adjustably positioned upon the casing 1. Preferably the illuminating means 4 is adapted to be fixedly positioned upon means 7 as indicated at 10 so as to be adjustably moved therewith.

In the present invention stereoscopic viewing lens 7 is preferably of the type and composition as is disclosed and claimed in my co-pending application, Serial No. 571,330 filed October 27, 1931 entitled "Apparatus for viewing projected pictures" and may also be of the type disclosed in my co-pending application, Serial No. 579,841 filed December 9, 1931 entitled "Improved stereoscopic viewing lens."

In the co-pending application first identified the stereoscopic viewing lens is comprised of light refracting material such as glass or phenol or phenol urea condensation products and is convex in type. The lens curvature is adapted to the contemplated use of the viewing apparatus, and is designed preferably so that the focal point of the lens is relatively close to the lens so that individuals viewing the lens beyond the focal point will see two images and thereby obtain the desired stereoscopic effect. To obtain this, the angle of curvature of the convex lens must be relatively slight. To cut off undesirable reflected radiation the lens is constructed preferably in accordance with the teachings of my co-pending application secondly above identified, wherein a lens comprised of that section of a spherical lens which lies substantially within the unaberrated area of the lens is disclosed and claimed.

The essential feature of the stereoscopic lens of the said co-pending applications above identified resides in the degree of translucency provided in the lens. The degree of translucency provided is less than that adapting the lens to form a shadow image of the picture being viewed therethrough. Preferably also the stereoscopic lens should possess a relatively high radiation absorbing property. In lieu thereof an element of relatively high radiation absorbing properties may be interposed between the viewing lens and the picture negative through which is projected the light radiation from a light source.

Means including a light source 6 and radiation diffusing means 4 to illuminate the picture 5 may be varied widely. It is essential, however, that means 4 be adapted to uniformly irradiate the face of the picture 5. Instead of a plurality of incandescent filament lamps as indicated in Figs. 2 and 4 a light source of the positive column type may be utilized as indicated in Fig. 5. A plurality of lamps of the negative column glow type also may be utilized if desired. Illumination by means of positive and negative glow electric discharge devices offer certain advantages in the type of radiation provided for illuminating the picture and for some type of pictures is preferable. For ordinary purposes, however, illumination by incandescent filament lamps are satisfactory and various effects can be obtained by variegating the light diffusing and transmitting properties of element 4.

In Fig. 3 I have illustrated a modification of the present invention wherein a magnifying lens system 11—12 is provided in addition to the stereoscopic lens viewing means 7 to permit the use of relatively small pictures 5. In this modification the picture illuminating means including light source 6 and light diffusing medium 4 are fixedly positioned upon the partition 13 on the side thereof facing the picture to be illuminated. Lens 11 is positioned in front of a suitable opening 14 in the partition and means 3 is provided to adjust picture supporting means 2 with respect to the lens 11 as indicated.

Lens system 11—12 may be comprised of a simple system as indicated or may be comprised of a plurality of intermediate lens elements designed to eliminate distortion or to reduce chromatic effects. In the simple lens system indicated lens 12 is preferably made adjustable with respect to lens 11 and for convenience preferably but not necessarily is fixedly positioned with respect to viewing lens 7. Lens 12 and 7 therefore may be enclosed within housing 9 adapted to be adjustably positioned upon housing 1 in the manner shown.

From the above description taken with the accompanying drawing it is apparent that many modifications and adaptations of the present invention may be made without departing essentially from the nature and scope thereof as may be encompassed within the following claims.

What I claim is:

1. In apparatus for viewing pictures, lithographs and the like by reflected radiation means to uniformly irradiate the face of said picture, a translucent plano-convex stereoscopic viewing lens through which the illuminated picture is observed, and a lens magnifying system interposed therebetween.

2. Picture viewing apparatus comprising a housing, picture supporting means contained therein, means to uniformly irradiate the face of said picture, a translucent plano-convex stereoscopic lens for viewing the illuminated picture, and means to adjustably position the picture with respect to the focal point of said lens to eliminate distortion of the picture.

3. Picture viewing apparatus comprising a housing, picture supporting means contained therein, means to uniformly irradiate the face of said picture, a lens system to magnify the picture, a translucent plano-convex stereoscopic lens for viewing the illuminated and magnified picture, and means to adjustably position the picture with respect to the focal point of said lens system to eliminate distortion of the picture.

CHARLES T. GODWIN.